United States Patent [19]

Ito

[11] Patent Number: 5,315,439
[45] Date of Patent: May 24, 1994

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 943,521

[22] Filed: Sep. 11, 1992

[30] Foreign Application Priority Data

Sep. 13, 1991 [JP] Japan ................. 3-310288

[51] Int. Cl.$^5$ ................. G02B 15/14; G02B 13/18; G02B 9/12
[52] U.S. Cl. ................. 359/689; 359/716; 359/791
[58] Field of Search ............ 359/686, 689, 715, 716, 359/773, 791, 676, 683

[56] References Cited

U.S. PATENT DOCUMENTS

| | | | |
|---|---|---|---|
| 4,773,744 | 9/1988 | Yamanashi | 359/689 |
| 4,822,152 | 4/1989 | Yamanashi | 359/686 |
| 4,840,467 | 6/1989 | Takada et al. | 359/689 |
| 4,854,682 | 8/1989 | Yamanashi | 359/689 |
| 4,978,204 | 12/1990 | Ito | 359/689 |
| 5,033,832 | 7/1991 | Ito | 359/689 |
| 5,069,536 | 12/1991 | Ogata | 359/689 |
| 5,196,962 | 3/1993 | Aoki | 359/689 X |

FOREIGN PATENT DOCUMENTS

| | | |
|---|---|---|
| 3930032A1 | 3/1990 | Fed. Rep. of Germany . |
| 63-43115 | 2/1988 | Japan . |
| 63-153511 | 6/1988 | Japan . |
| 63-157120 | 6/1988 | Japan . |
| 63-159818 | 7/1988 | Japan . |
| 63-161423 | 7/1988 | Japan . |
| 2-73211 | 3/1990 | Japan . |
| 2224131A | 4/1990 | United Kingdom . |
| 2233113A | 1/1991 | United Kingdom . |
| 2251955A | 7/1992 | United Kingdom . |

Primary Examiner—William L. Sikes
Assistant Examiner—David R. Parsons
Attorney, Agent, or Firm—Sughrue, Mion, Zinn, Macpeak & Seas

[57] ABSTRACT

An improved zoom lens system includes at least three lens groups which are arranged, in order from the object side, as a first lens group having a positive focal length, a second lens group having a positive focal length and a third lens group having a negative focal length. When zooming is carried out from the wide angle to the telephoto end, the first, second and third lens group are all moved towards the object so that the distance between the first and second lens groups increases whereas the distance between the second and third lens groups decreases. The first lens group has a first lens element with a concave lens surface on the side the closest to object while satisfying specific conditions.

5 Claims, 10 Drawing Sheets

ZOOM LENS SYSTEM

BACKGROUND OF THE INVENTION

The present application is based upon Japanese Patent Application No. HEI 3 310288 filed Sep. 13, 1991, a disclosure of which is incorporated herein by reference.

The present invention relates to a zoom lens system that is suitable for use with compact cameras which have a small constraint on back focus. More particularly, the present invention relates to a zoom lens system that features a high zoom ratio of 2.5 and more.

Various types of zoom lens systems have heretofore been known for use with compact cameras. Zoom lenses consisting of three lens groups or more with a zoom ratio exceeding 2 are categorized as follows:

(i) Four-group zoom lens systems comprising a positive first lens group, a negative second lens group, a stop diaphragm disposed behind the second lens group, as well as a positive third lens group and a negative fourth lens group, all lens groups being moved independently of each other towards the object (this type includes a system where some of the four lens groups are moved in unison). Examples of such zoom lens systems are disclosed in Japanese Patent Laid-Open Publications No. SHO 63-43115, No. SHO 63-159818 and No. SHO63-157120.

(ii) Three-group zoom lens systems comprising a positive first lens group, a positive second lens group (which includes a stop diaphragm and comprises a negative sub-group 2a disposed closer to the object than the diaphragm and a positive sub-group 2b disposed closer to the image plane than the diaphragm and which is equivalent to the second and third lens groups of the four-group zoom lens system (i)), and a negative third lens group (which is equivalent to the fourth group of the four-group zoom lens system (i)), all lens groups being moved independently of each other towards the object. Examples of this zoom lens system are disclosed in Japanese Patent Laid-Open Publications No. SHO 63-153511 and No. SHO 63-161423.

(iii) Three-group zoom lens systems comprising a positive first lens group, a positive second lens group (as in the system (ii), this positive lens group comprises, in order from the object side, a negative sub-group 2a and a positive sub-group 2b but no stop diaphragm is included), a stop diaphragm disposed behind the second lens group, as well as a negative third lens group with all lens groups being moved towards the object (see, for example, commonly assigned Japanese Patent Laid-Open Publication No. HEI 2-73211).

(iv) A practically four-group zoom lens system that is the same as the system (iii) except that the sub-groups 2a and 2b are moved independently of each other (see Example 3 in the specification of commonly assigned Japanese Patent Application No. SHO 63-225294, supra).

The above-described conventional zoom lens systems have their own problems. In the system (i), all of the four lens groups have to be moved independently of each other, so a large number of cams must be used in a restricted small space, causing difficulty in designing an effective mechanical composition.

In the systems (i) and (ii), the stop diaphragm is disposed between the sub-groups 2a and 2b (in the case of the four-group type, the stop diaphragm is disposed between the second and third lens groups); however, the shutter block also serving as a stop diaphragm must be disposed between the two lens groups which are subject to substantial deterioration in performance due to any manufacturing errors, so the overall lens arrangement will become complex, making it difficult to insure high mechanical precision. In addition, the high optical sensitivity of either system has made it difficult to achieve stabilization in optical performance.

Further, all systems (i), (ii), (iii) and (iv) have one problem in common; that is, the overall compactness of those systems is insufficient for using them with a compact camera and this is because the negative first lens element has a concave surface of such a large curvature on the image plane side that the overall length of the first lens group is increased, which is unfavorable for the purpose of reducing the lens diameter and the overall length of the entire lens system.

The present invention has been accomplished under these circumstances and has as an object providing a zoom lens system for use with a compact camera that is particularly improved in the first lens group to achieve a high zoom ratio of 2.5 and more. Another object of the present invention is to provide a zoom lens system suitable for use with a compact camera that successfully achieves reduction in the lens diameter and the overall lens length.

SUMMARY OF THE INVENTION

These objects and other of the present invention can be attained by a zoom lens system that comprises at least three lens groups which are arranged, in order from the object side, as a first lens group having a positive focal length, second lens group having a positive focal length and a third lens group having a negative focal length, wherein, when zooming is carried out from the wide-angle to the telephoto end, the first, second and third lens groups are all moved towards the object so that the distance between the first and second lens groups increases whereas the distance between said second and third lens groups decreases characterized in that the first lens group has a first lens element with a concave lens surface on the side the closest to the object and satisfies the following condition (a):

$$a - 3 < (r11 + r12)/(r11 - r12) < 0 \qquad (a)$$

where r11:
the radius of curvature of the surface on the object side of the first lens element in the first lens group; and r12:
the radius of curvature of the surface on the image plane side of the first lens element in the first lens group.

DESCRIPTION OF THE PREFERRED EMBODIMENTS

Figure 1:
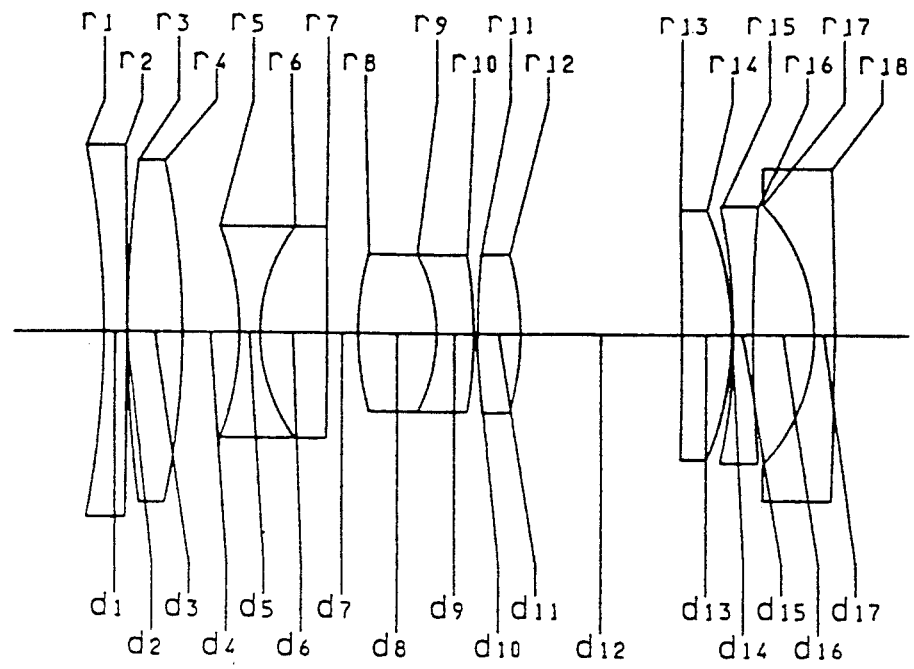
FIG. 1 is a simplified cross-sectional view of the zoom lens system according to Example 1 at the wide-angle end.

Examples of the present invention are described below.

The zoom lens systems according to the examples of the present invention which are described hereinafter comprise, in order from the object side, a first lens group having a positive focal length, a second lens group having a positive focal length, and a third lens group having a negative focal length and each of them is a zoom lens system of a telephoto type for use with a compact camera that consists of three lens groups in total, that features a high zoom ratio of 2.5 and more, and which successfully reduces the lens diameter, the overall lens length and the necessary amount of lens movement by introducing special features in the arrangement of lens elements in the first lens group and their shape. Each zoom lens system satisfies the following condition (a):

$$a\ -3 < (r11+r12)/(r11-r12) < 0 \qquad (a)$$

where r11:
the radius of curvature of the surface on the object side of the first lens element in the first lens group; and r12:
the radius of curvature of the surface on the image plane side of the first lens element in the first lens group.

By adopting this lens arrangement and, in particular, by introducing a special feature in the shape of the negative first lens element in the first lens group, a retrofocus type composition is realized and this is effective in reducing the overall length of the first lens group, thereby rendering the overall lens system compact.

The negative first lens element in the first lens group of the zoom lens system of the present invention differs in shape from the prior art system and it has a concave surface of large curvature on the object side that is negative and which has a greater power than the surface on the image plane side. Since the zoom lens system of the present invention is of a telephoto type that consists of three groups, positive, positive and negative, the back focus of the overall system tends to decrease. However, even a lens system for use with compact camera requires a back focus of measurable length; otherwise, the lens diameter of the last lens group will increase and other problems such as internal reflection will occur. In order to solve these problems, it is preferred that a surface having a great negative power is disposed in the first lens group on the side which is further ahead, namely, on the object side.

For satisfying other conditions than that of the back focus of the overall lens system and in order to render the first lens group of a retrofocus type so that a wider view angle can be insured whereas the overall lens length and the lens diameter of the first lens group can be reduced, the first lens element in the first lens group is preferably designed as a negative lens having a concave surface on the object side.

Condition (a) specifies the shape factor of the first lens element. If the upper limit of this condition is exceeded, the surface of this lens element on the image plane side will have a greater curvature than the surface on the object side as in the prior art and the overall length of the first lens group tends to increase. If the lower limit of condition (a) is not reached, the curvature of the concave surface on the object side becomes so large that difficulty is involved in correcting aberrations.

The first lens group preferably comprises, in order from the object side, a negative first lens element and a positive second lens element, with the following conditions (b), (c) and (d) being satisfied:

$$b\ 1.7 < N1 \qquad (b)$$

$$c\ 1.6 < N2 \qquad (c)$$

$$(d)\ -0.5 < (r21+r22)/(r21-r22) < 1.5 \qquad (d)$$

where N1:
the refractive index at the d-line of the first lens element in the first lens group;

N2:
the refractive index at the d-line of the second lens element in the first lens group;

r21:
the radius of curvature of the surface on the object side of the second lens element in the first lens group; and r22:
the radius of curvature of the surface on the image plane side of the second lens element in the first lens group.

Conditions (b) and (c) relate to the refractive indices of the two lens elements of the first lens group. If those conditions are satisfied, the radius of curvature lens necessary for providing a predetermined power can be increased. Therefore, the edge thickness of the first lens element and the center thickness of the second lens element in the first lens group can be sufficiently reduced to facilitate the manufacturer's effort reduce the size of the first lens group.

Condition (d) relates to the shape of the positive second lens element in the first lens group and it must be satisfied in order to correct the aberrations that occur at the concave surface on the object side of the negative first lens element. If the lower limit of this condition not reached, the curvature radius of the convex surface on the image plane side of the second lens element will increase, leading to undercorrection of aberrations; if the distance between the first and second lens elements is reduced with a view to realizing compactness, difficulty is involved in correcting aberrations. If, on the other hand, the upper limit of condition (d) is exceeded, the curvature radius of the convex surface on the image plane side will decrease so much as to cause overcorrection of the aberrations that occur within the first lens group; in addition, higher-order aberrations will occur, which is another factor that introduces difficulty in correcting aberrations.

As in the case of the first lens group, the positive second lens group also preferably comprises, in order from the object side, a negative sub-group 2a and a positive sub-group 2b in order to insure that the overall lens system has a measurable back focus.

If the lens diameter of the first lens group is reduced, the spherical aberration that develops in it tends to be undercorrected. On the other hand, the second lens group has a very great positive power, so it is difficult to attain balance between spherical and other aberrations that occur in the second lens group. It is therefore preferred that the spherical aberration that occurs in the second lens group is corrected by the divergent aspheric surface whereas all other aberrations are corrected by the spherical surface, thereby attaining balance between all the aberrations that occur in the second lens group.

The aspheric surface is advantageously positioned in the sub-group 2b of the second lens group. If this condition is met, the lens diameter is sufficiently reduced to facilitate lens manufacture; in addition, the aspheric surface is close enough to the stop diaphragm to provide ease in controlling the spherical aberration that takes place in the second lens group.

The sub-group 2b of the second lens group is desirably provided with a divergent aspheric surface that satisfies the following condition (e):

$$e-30 < \Delta I2b < 0 \qquad (e)$$

where $\Delta I2b$:
the amount of variation in the coefficient of a spherical aberration due to the aspheric surface in the sub-group 2b (the aberration coefficient being such as is calculated with the focal length of the overall system at the wide-angle end being taken as 1.0).

Condition (e) should be satisfied in order to obtain a divergent aspheric surface. If the upper limit of this condition is exceeded, the aspheric surface is no longer divergent and undercorrection of spherical aberration will occur. If the lower limit of condition (e) is not reached, the resulting spherical aberration will be undercorrected and, furthermore, the chance of the occurrence of higher-order aberrations will increase undesirably.

The following is a supplemental discussion of the amount of variation in the coefficient of the third-order aberration due to an aspheric surface. The shape of an aspheric surface can generally be expressed by equation (1):

$$x = \frac{cy^2}{1 + \sqrt{1 - (1+K)c^2y^2}} + a4y^4 + a6y^6 + a8y^8 + a10y^{10} \qquad (1)$$

where x is the distance by which the coordinates at the point on the aspheric surface where the height from the optical axis is y are departed from the plane tangent to the vertex of the aspheric surface; c is the curvature (1/r) of the vertex of the aspheric surface; K is the conic constant; and $a4$, $a6$, $a8$ and $a10$ are the aspheric coefficients of the fourth, sixth, eighth and tenth orders, respectively.

By calculating the focal length as f=1.0, namely, by substituting x=x/f, y=y/f, c=fc, A4=$f^3a4$, A6=$f^5a6$, A8=$f^7a8$ and A10=$f^9a10$ into equation (1), the following equation (2) is obtained:

$$X = \frac{cY^2}{1 + \sqrt{1 - (1+K)c^2Y^2}} + A4Y^4 + A6Y^6 + A8Y^8 + A10Y^{10} \qquad (2)$$

The second and subsequent terms of equation (2) define the amount of sphericity, and the relationship between the coefficient A4 of the second term and the third-order aspheric coefficient $\phi$ is expressed by:

$$\phi = 8(N'-N)A4$$

where N is the refractive index of the medium before the aspheric surface and N, is the refractive index of the medium after the aspheric surface.

The aspheric coefficient $\phi$ provides the following amounts of variation in third-order aberration coefficients as one may call in the theory of aberrations:

$$\Delta I = h^4 \phi$$

$$\Delta II = h^3 H \phi$$

$$\Delta III = h^2 H^2 \phi$$

$$\Delta IV = h^2 H^2 \phi$$

$$\Delta V = h H^3 \phi$$

where
I: spherical aberration coefficient;
II: coma coefficient;
III: astigmatism coefficient
IV: sagittal field curvature coefficient;
V: distortion coefficient;
h: the height of paraxial on-axis rays at which they pass through each lens surface; and
H: the height of paraxial off-axis rays passing through the center of the pupil, at which height they pass through each lens surface.

The shape of an aspheric surface can be expressed by various other equations, but if y is smaller than the paraxial radius of curvature, satisfactory approximation can be achieved by even-order terms alone. Hence, it should be understood that the applicability of the present invention is in no compromised by merely changing the equations for expressing the shape of aspheric surface.

It should also be noted that the applicability of the present invention will extend to both the four-group zoom lens system that is described in the Prior Art section of this specification and a three-group zoom lens system in which the last lens group is followed by a rear lens group having a smaller power.

The stop diaphragm may be positioned either within the second lens group or behind it. In the former case, the lens diameter of the front group can h=reduced but, on the other hand, difficulty is involved in designing an effective lens composition. In the latter case (where the stop diaphragm is positioned between the second and third lens groups), the lens block can be separated from the shutter block, contributing to the realization of a simple mechanistic structure.

Examples 1 to 5 of the zoom lens system of the present invention are described below with reference to data sheets, in which f denotes the focal length, fB the back focus, r the radius of curvature of an individual lens surface, d the lens thickness or the air-space between lenses (the foregoing parameters are in millimeters), FNO the F number, $\omega$, the half view angle (in degrees), n the refractive index of an individual lens at the d-line, and $\nu$ the Abbe number of an individual lens, with $\alpha 4$, $\alpha 6$ and $\alpha 8$ denoting the aspheric coefficients of the fourth, sixth and eighth orders, respectively.

EXAMPLE 1

Figure 2A:
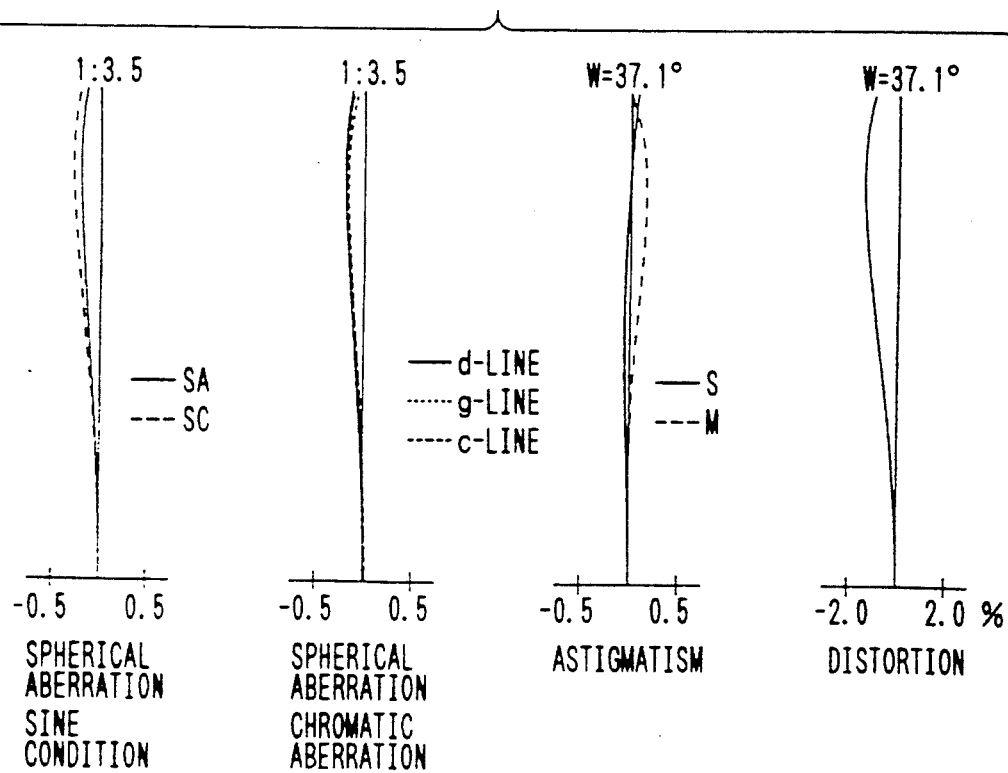
FIG. 2(a)–2(c) are a set of graphs plotting the aberration curves obtained with the zoom lens system of Example 1.
Figure 2B:
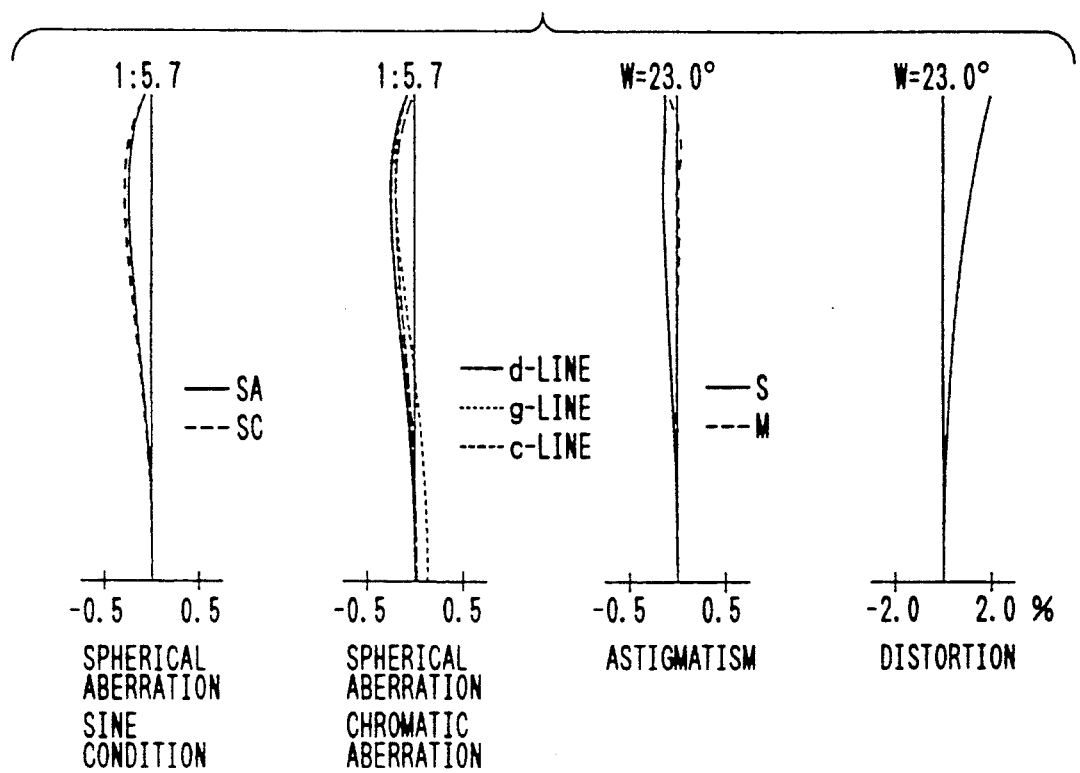
Figure 2C:
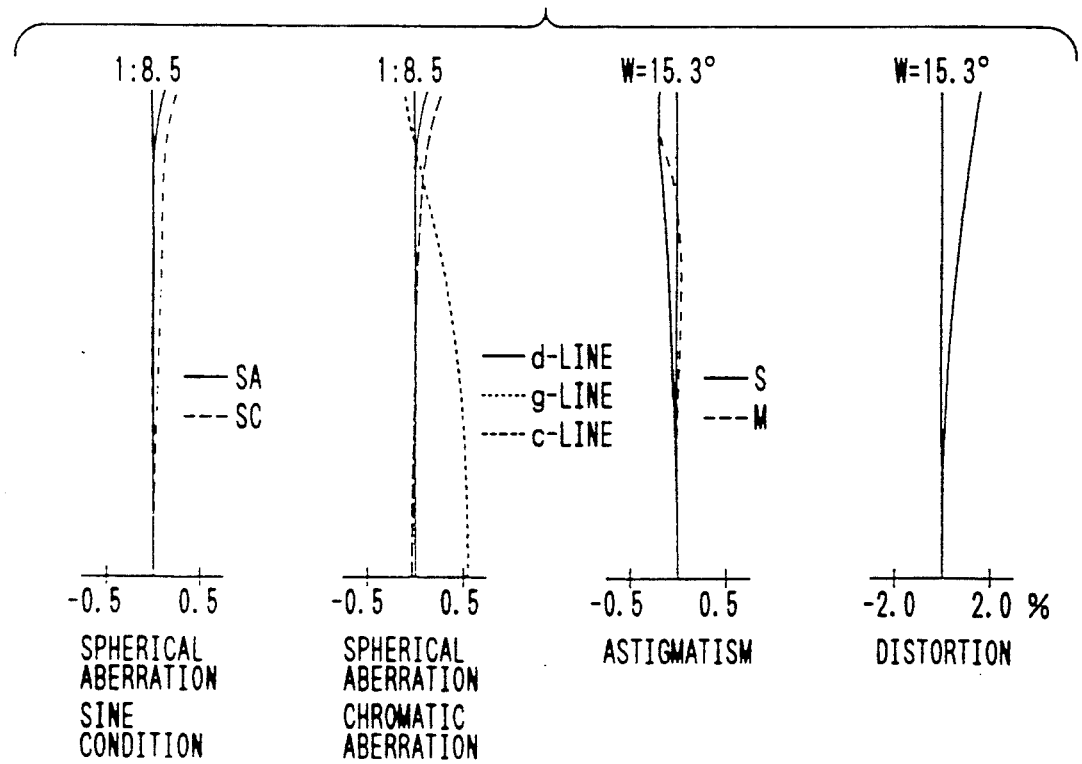

FIG. 1 is a simplified cross-sectional view of the zoom lens system according to Example 1 at the wide-angle end. Specific data for this example are as shown in Table 1. The aberration curves obtained with this lens system are plotted in FIGS. 2(a), 2(b) and 2(c).

TABLE 1

FNO. = 1:3.5, f = 28.88, $\omega$ = 37.1, fB = 8.28

| Surface No. | r | d | n | $\nu$ |
|---|---|---|---|---|
| 1 | −61.536 | 1.50 | 1.84666 | 23.8 |
| 2 | −790.451 | 0.10 | | |
| 3 | 88.870 | 3.64 | 1.77250 | 49.6 |
| 4 | −53.330 | variable | | |
| 5 | −19.164 | 1.35 | 1.83481 | 42.7 |
| 6 | 11.464 | 4.50 | 1.80518 | 25.4 |
| 7 | −410.506 | 2.09 | | |
| 8 | 18.604 | 5.25 | 1.48749 | 70.2 |
| 9 | −11.019 | 2.50 | 1.80518 | 25.4 |
| 10 | −30.809 | 0.32 | | |
| 11 | 53.762 | 2.88 | 1.58913 | 61.2 |
| 12* | −17.637 | variable | | |
| 13 | −307.850 | 3.28 | 1.80518 | 25.4 |
| 14 | −21.476 | 0.10 | | |
| 15 | −41.134 | 1.30 | 1.83400 | 37.2 |
| 16 | 100.927 | 4.08 | | |
| 17 | −12.365 | 1.40 | 1.77250 | 49.6 |
| 18 | −269.479 | | | |

Twelfth surface: aspheric
K = 0
$\alpha 4 = 0.63680758 \times 10^{-4}$
$\alpha 6 = 0.53551756 \times 10^{-7}$
$\alpha 8 = 0.11152752 \times 10^{-8}$ The values of Fno., f, fB, $\omega$, d4 and d12 vary with zooming as shown in Table 2 below.

TABLE 2

| FNo. | 3.5 | 5.8 | 8.5 |
|---|---|---|---|
| f | 28.88 | 50.00 | 77.91 |
| fB | 8.28 | 26.54 | 49.56 |
| $\omega$ | 37.1 | 23.0 | 15.3 |
| d4 | 3.84 | 8.42 | 12.08 |
| d12 | 10.70 | 5.03 | 2.05 |

Example 2

Figure 3:
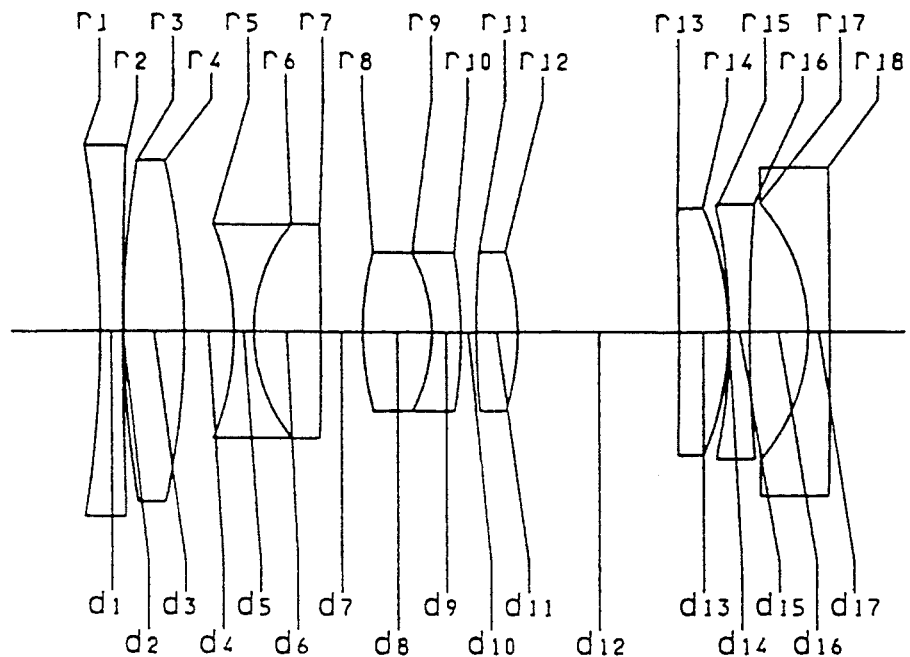
FIG. 3 is a simplified cross-sectional view of the zoom lens system according to Example 2 at the wide-angle end.
Figure 4A:
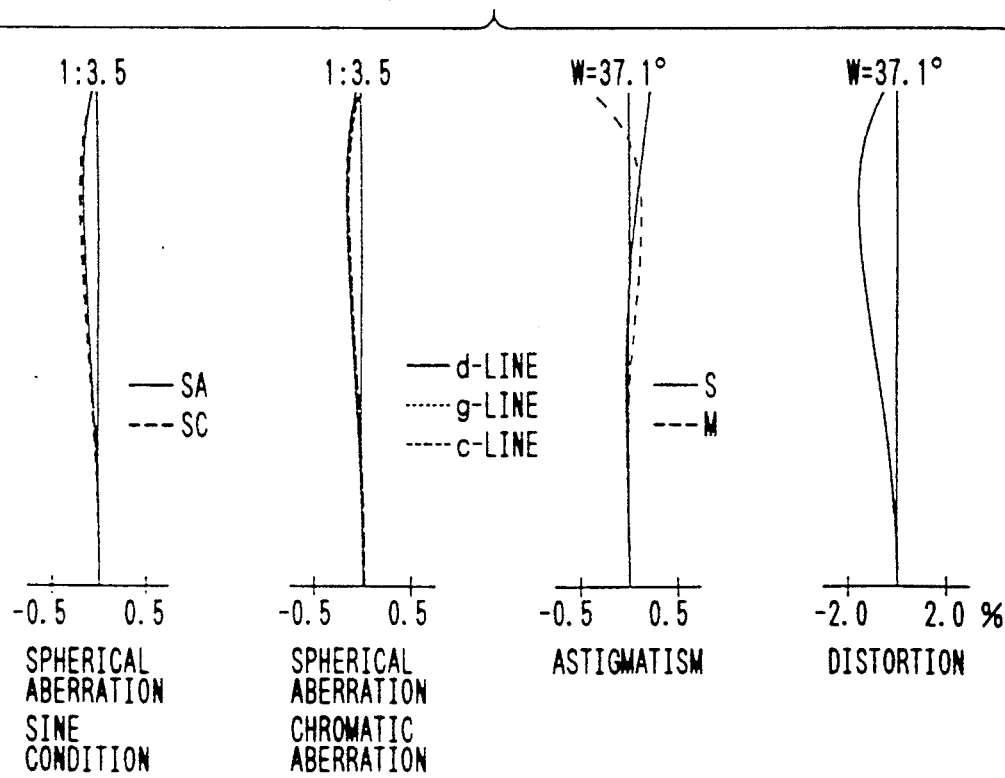
FIG. 4(a)–4(c) are a set of graphs plotting the aberration curves obtained with the zoom lens system of Example 2.
Figure 4B:
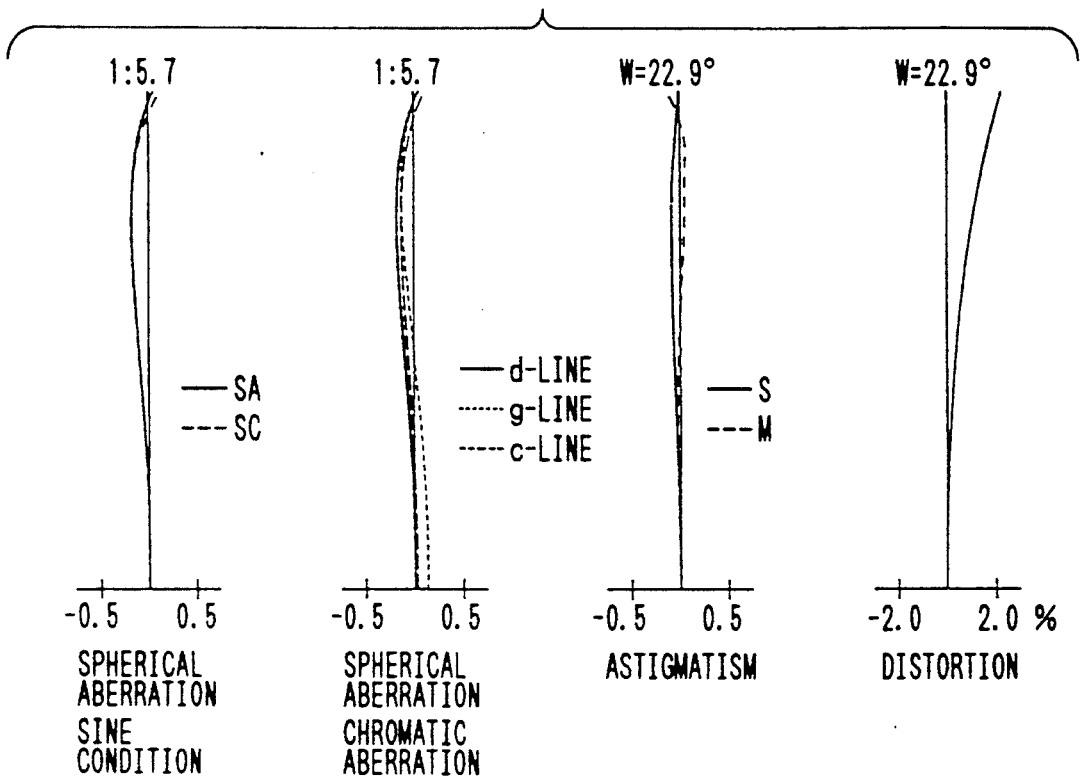
Figure 4C:
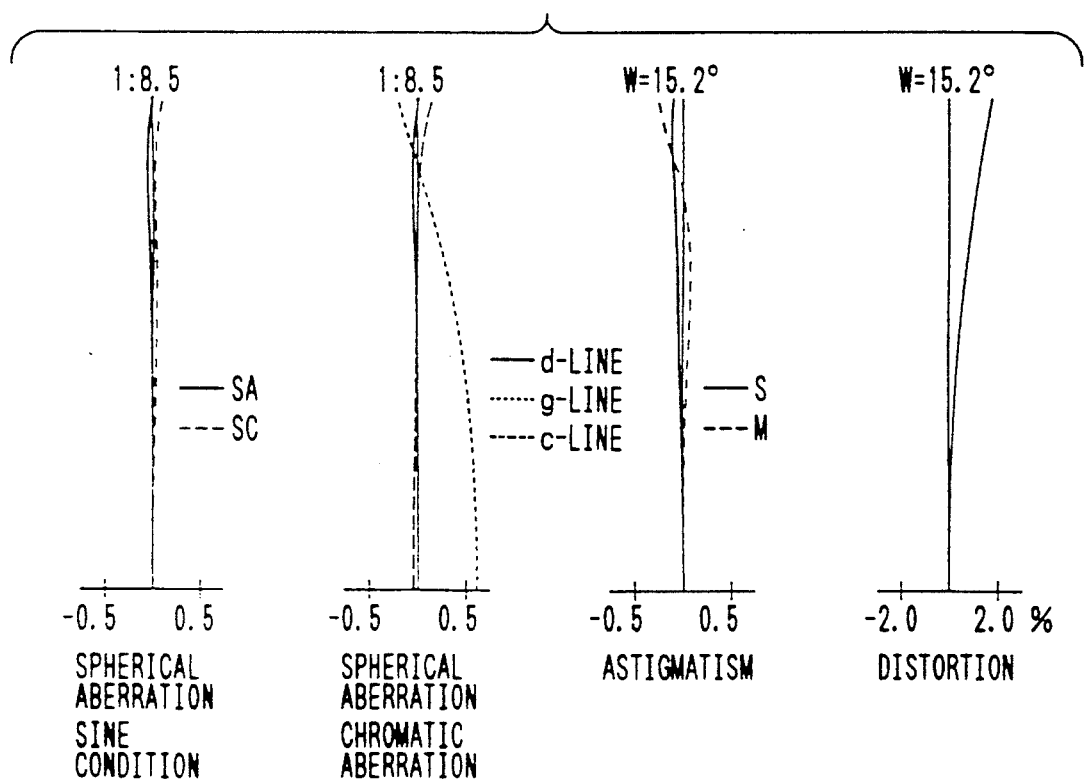

FIG. 3 is a simplified cross-sectional view of the zoom lens system according to Example 2 at the wide-angle end. Specific data for this example are as shown in Table 3. The aberration carvers obtained with this lens system are plotted in FIGS. 4(a), 4(b) and 4(c).

TABLE 3

FNO. = 1:3.5, f = 28.80, $\omega$ = 37.1, fB = 8.31

| Surface No. | r | d | n | $\nu$ |
|---|---|---|---|---|
| 1 | −71.000 | 1.50 | 1.84666 | 23.8 |
| 2 | 334.800 | 0.10 | | |
| 3 | 69.120 | 4.07 | 1.77250 | 49.6 |
| 4 | −48.983 | variable | | |
| 5 | −18.860 | 1.35 | 1.83481 | 42.7 |
| 6 | 10.968 | 4.50 | 1.80518 | 25.4 |
| 7 | −294.907 | 2.81 | | |
| 8 | 20.253 | 4.57 | 1.48749 | 70.2 |
| 9 | −10.902 | 2.00 | 1.80518 | 25.4 |
| 10 | −29.730 | 1.05 | | |
| 11 | 66.000 | 2.73 | 1.58913 | 61.2 |
| 12* | −16.568 | variable | | |
| 13 | −265.000 | 3.22 | 1.80518 | 25.4 |
| 14 | −20.983 | 0.10 | | |
| 15 | −38.129 | 1.30 | 1.83400 | 37.2 |
| 16 | 103.398 | 3.93 | | |
| 17 | −12.734 | 1.40 | 177250 | 49.6 |
| 18 | −894.708 | | | |

Twelfth surface: aspheric
K = 0
$\alpha 4 = 0.6518794 \times 10^{-4}$
$\alpha 6 = -0.50080477 \times 10^{-7}$
$\alpha 8 = 0.10270326 \times 10^{-8}$ The values of Fno., f, fB, $\omega$, d4 and d12 vary with zooming as shown in Table 4 below.

TABLE 4

| FNo. | 3.5 | 5.8 | 8.5 |
|---|---|---|---|
| f | 28.80 | 50.00 | 78.11 |
| fB | 8.31 | 26.61 | 49.80 |
| $\omega$ | 37.1 | 22.9 | 15.2 |
| d4 | 3.29 | 6.78 | 9.69 |
| d12 | 10.78 | 5.28 | 2.40 |

EXAMPLE 3

Figure 5:
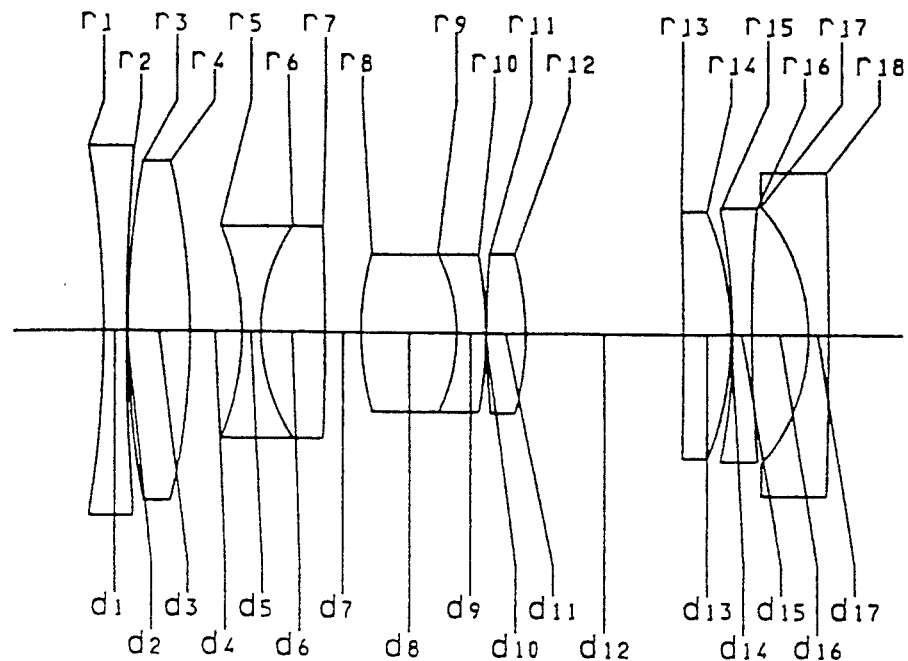
FIG. 5 is a simplified cross-sectional view of the zoom lens system according to Example 3 at the wide angle end.
Figure 6A:
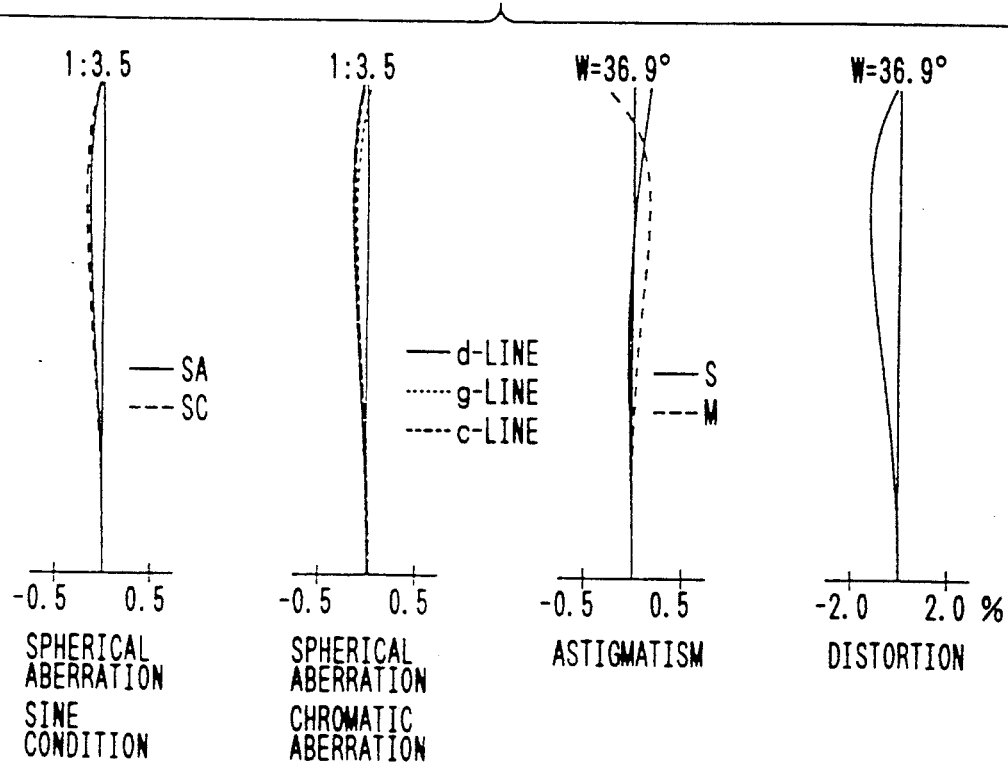
FIG. 6 is a set of graphs plotting the aberration curves obtained with the zoom lens system of Example 3.
Figure 6B:
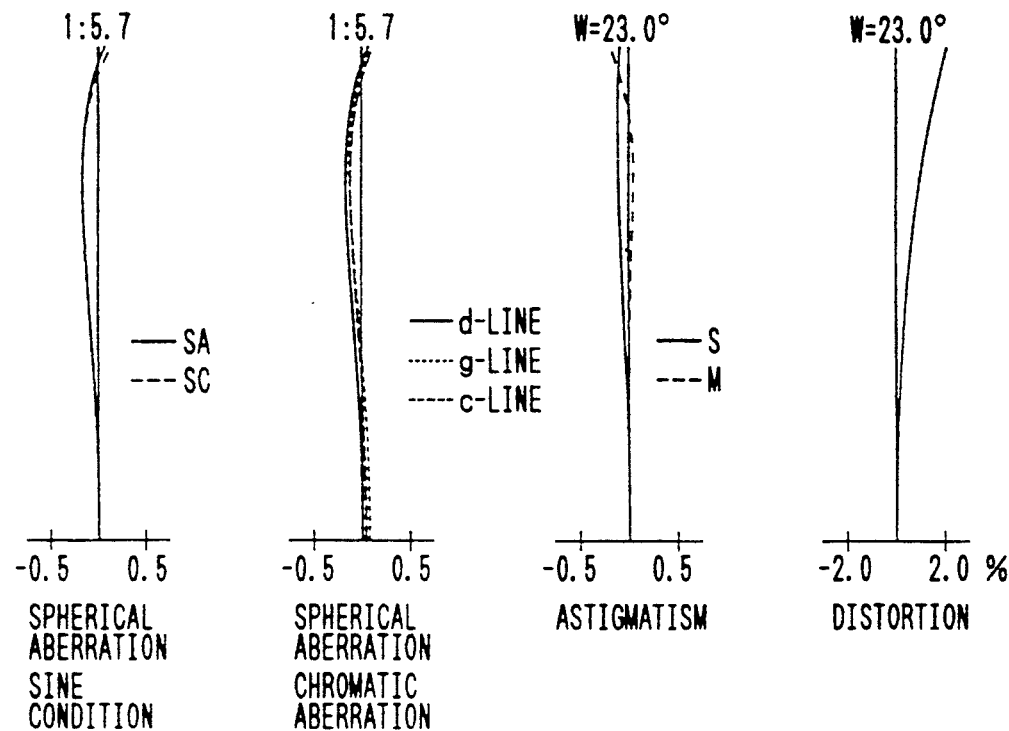
Figure 6C:
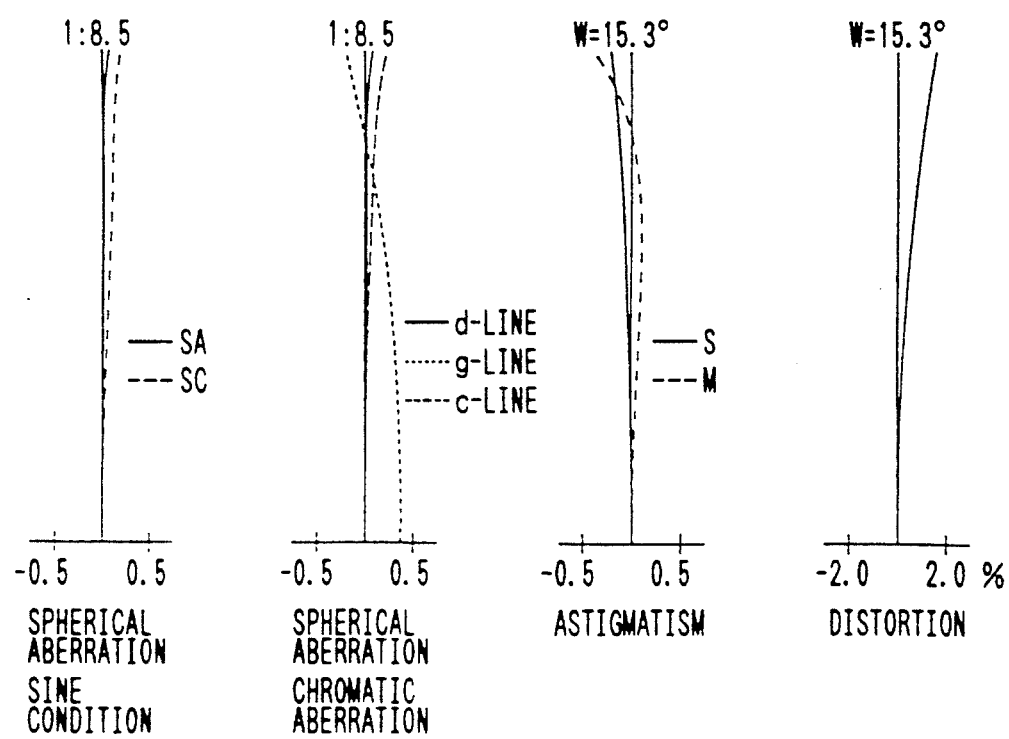

FIG. 5 is a simplified cross-sectional view of the zoom lens system according to Example 3 at the wide-angle end. Specific data for this example are as shown in Table 5. The aberration curves obtained with this lens system are plotted in FIGS. 6(a), 6(b) and 6(c).

TABLE 5

FNO. = 1:3.5, f = 28.90, $\omega$ = 36.9, fB = 8.46

| Surface No. | r | d | n | $\nu$ |
|---|---|---|---|---|
| 1 | −71.730 | 1.50 | 1.80518 | 25.4 |
| 2 | 140.769 | 0.15 | | |
| 3 | 61.864 | 4.20 | 1.77250 | 49.6 |
| 4 | −47.498 | variable | | |
| 5 | −17.836 | 1.30 | 1.83481 | 42.7 |
| 6 | 12.322 | 4.30 | 1.80518 | 25.4 |
| 7 | −176.071 | 2.48 | | |
| 8 | 18.502 | 6.42 | 1.48749 | 70.2 |
| 9 | −11.136 | 1.90 | 1.80518 | 25.4 |
| 10 | −28.879 | 0.10 | | |
| 11 | 65.143 | 2.60 | 1.58913 | 61.2 |
| 12* | −17.705 | variable | | |
| 13 | −280.995 | 3.20 | 1.80518 | 25.4 |
| 14 | −21.084 | 0.10 | | |
| 15 | −40.780 | 1.30 | 1.83481 | 42.7 |
| 16 | 98.461 | 3.83 | | |
| 17 | −12.630 | 1.40 | 1.80400 | 46.6 |
| 18 | −346.647 | | | |

Twelfth surface: aspheric
K = 0
$\alpha 4 = 0.65631000 \times 10^{-4}$
$\alpha 6 = -0.48837800 \times 10^{-7}$
$\alpha 8 = 0.73950100 \times 10^{-9}$ The values of Fno., f, fB, $\omega$, d4, and d12 vary with zooming as shown in Table 6 below.

TABLE 6

| FNo. | 3.5 | 5.8 | 8.5 |
|---|---|---|---|
| f | 28.90 | 50.03 | 78.03 |
| fB | 8.46 | 26.81 | 50.19 |
| ω | 36.9 | 23.0 | 15.3 |
| d4 | 3.47 | 6.85 | 9.62 |
| d12 | 10.43 | 4.99 | 2.15 |

Example 4

Figure 7:
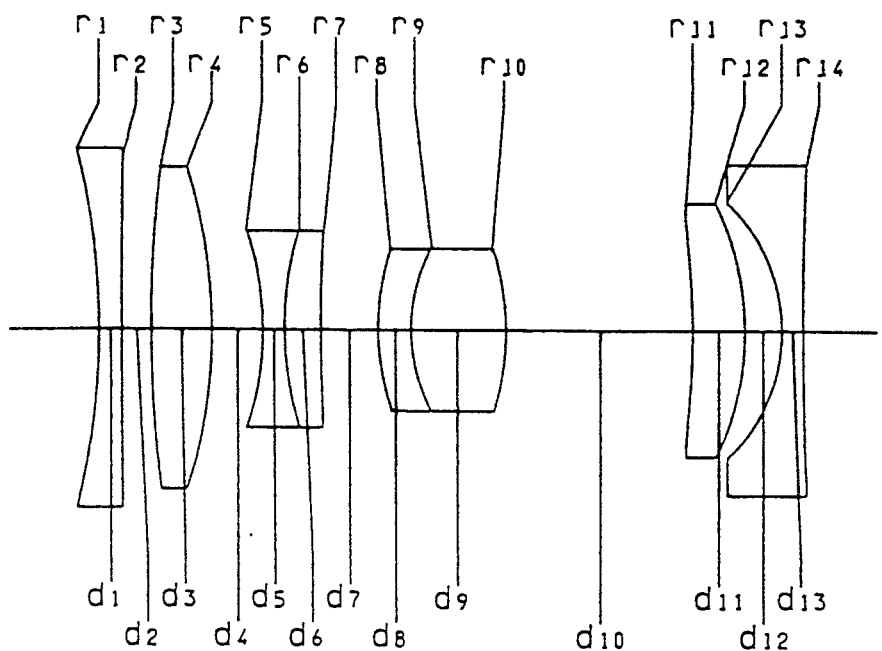
FIG. 7 is a simplified cross-sectional view of the zoom lens system according to Example 4 at the wide-angle end.
Figure 8A:
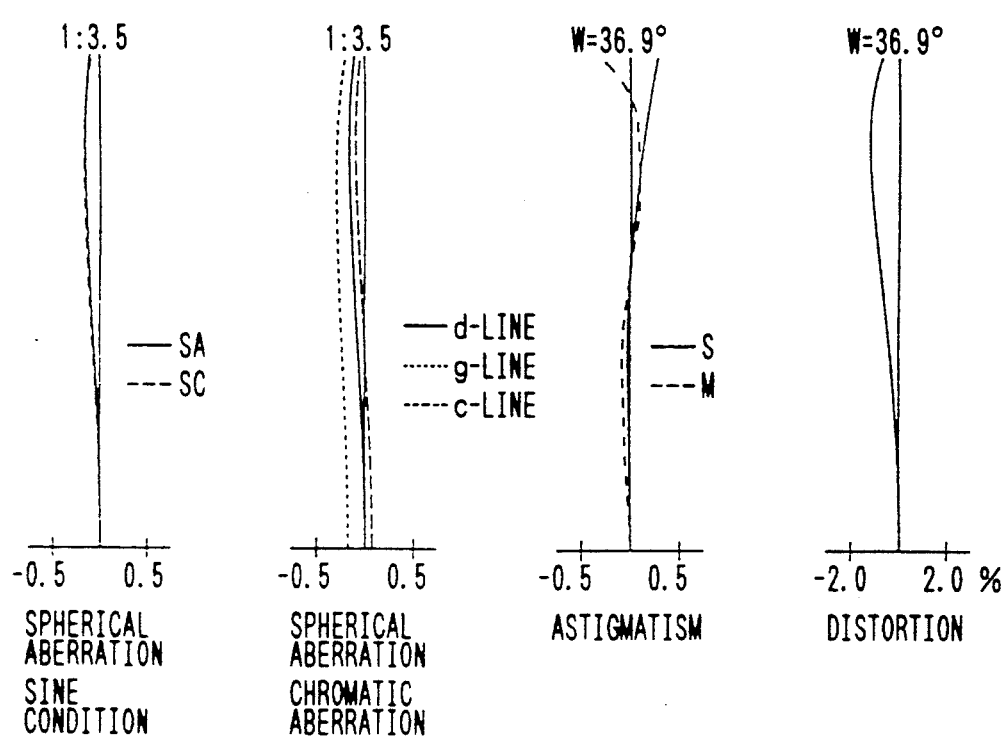
FIG. 8(a)–8(c) are a set of graphs plotting the aberration curves obtained with the zoom lens system of Example 4.
Figure 8B:
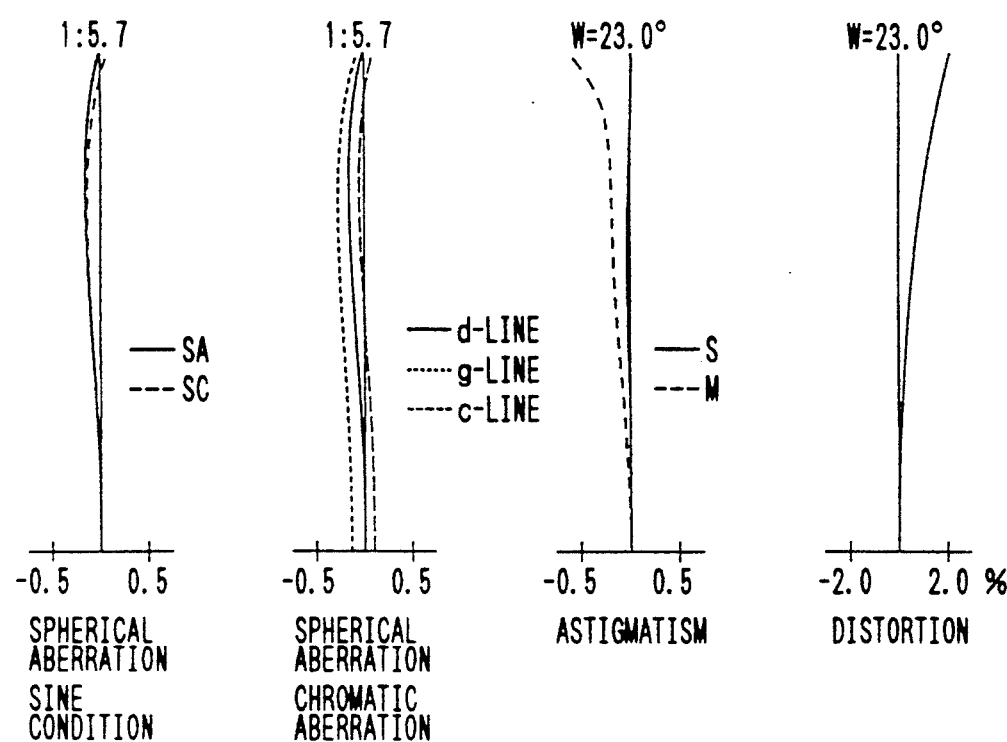
Figure 8C:
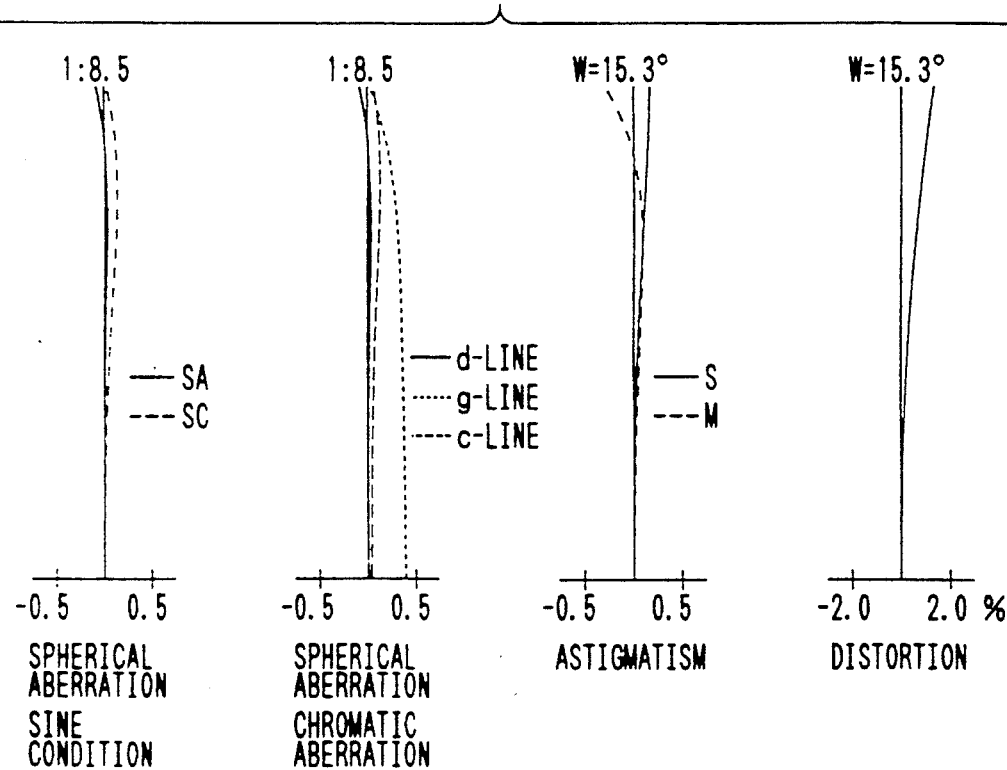

FIG. 7 is a simplified cross-sectional view of the zoom lens system according to Example 4 at the wide-angle end. Specific data for this example are as shown in Table 7. The aberration curves obtained with this lens system are plotted in FIGS. 8(a), 8(b) and 8(c).

TABLE 7

FNO. = 1:3.6; f = 29.00, ω = 36.9, fB = 8.30

| Surface No. | r | d | n | ν |
|---|---|---|---|---|
| 1 | −48.126 | 1.50 | 1.83400 | 37.2 |
| 2 | 827.145 | 2.02 | | |
| 3 | 86.943 | 4.00 | 1.69680 | 55.5 |
| 4 | −35.944 | variable | | |
| 5* | −21.729 | 1.50 | 1.73077 | 40.5 |
| 6 | 21.987 | 2.43 | 1.80518 | 25.4 |
| 7 | 109.603 | 3.85 | | |
| 8 | 16.557 | 2.30 | 1.80518 | 25.4 |
| 9 | 11.098 | 6.38 | 1.58913 | 61.2 |
| 10* | −16.145 | variable | | |
| 11* | −44.354 | 3.42 | 1.68893 | 31.1 |
| 12 | −19.176 | 2.50 | | |
| 13 | −11.580 | 1.40 | 1.77250 | 49.6 |
| 14 | 228.860 | | | |

Fifth surface: aspheric
K = 0
α4 = −0.40328626 × 10$^{-4}$
α6 = −0.30242012 × 10$^{-6}$
α8 = 0.14154205 × 10$^{-8}$
Eleventh surface: aspheric
K = 0
α4 = 0.44758114 × 10$^{-4}$
α6 = 0.22807597 × 10$^{-6}$
α8 = 0.64325486 × 10$^{-9}$
Tenth surface: aspheric
K = 0
α4 = 0.76751422 × 10$^{-4}$
α6 = 0.92777629 × 10$^{-7}$
α8 = 0.14241736 × 10$^{-8}$ The values of Fno., f, fB, ω, d4 and d10 vary with zooming as shown in Table 8 below.

TABLE 8

| FNo. | 3.6 | 5.9 | 8.5 |
|---|---|---|---|
| f | 29.00 | 50.02 | 78.08 |
| fB | 8.30 | 28.17 | 53.94 |
| ω | 36.9 | 23.0 | 15.3 |
| d4 | 3.36 | 6.90 | 9.69 |
| d12 | 12.25 | 6.00 | 2.75 |

Example 5

Figure 9:
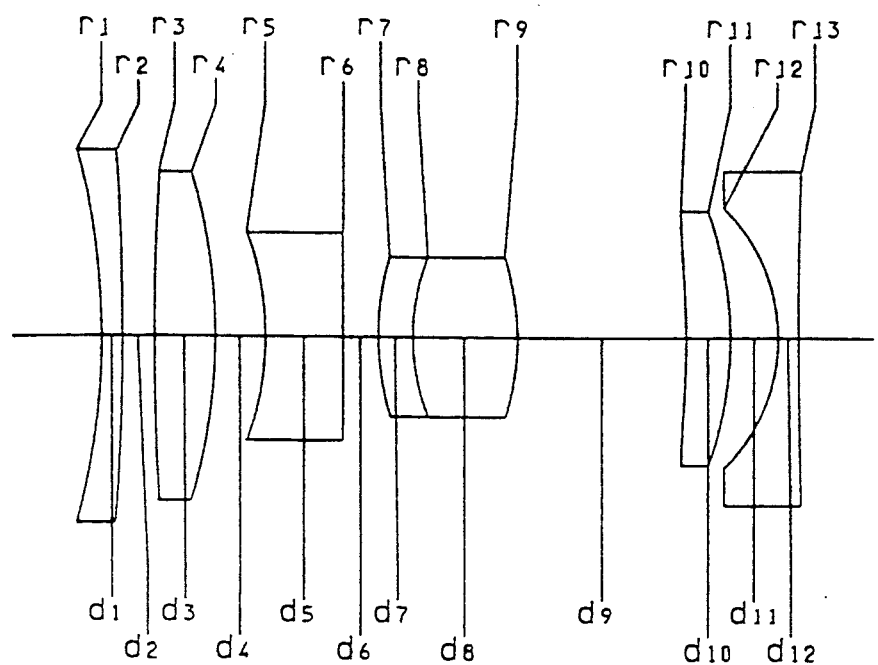
FIG. 9 is a simplified cross-sectional view of the zoom lens system according to Example 5 at the wide-angle end.
Figure 10A:
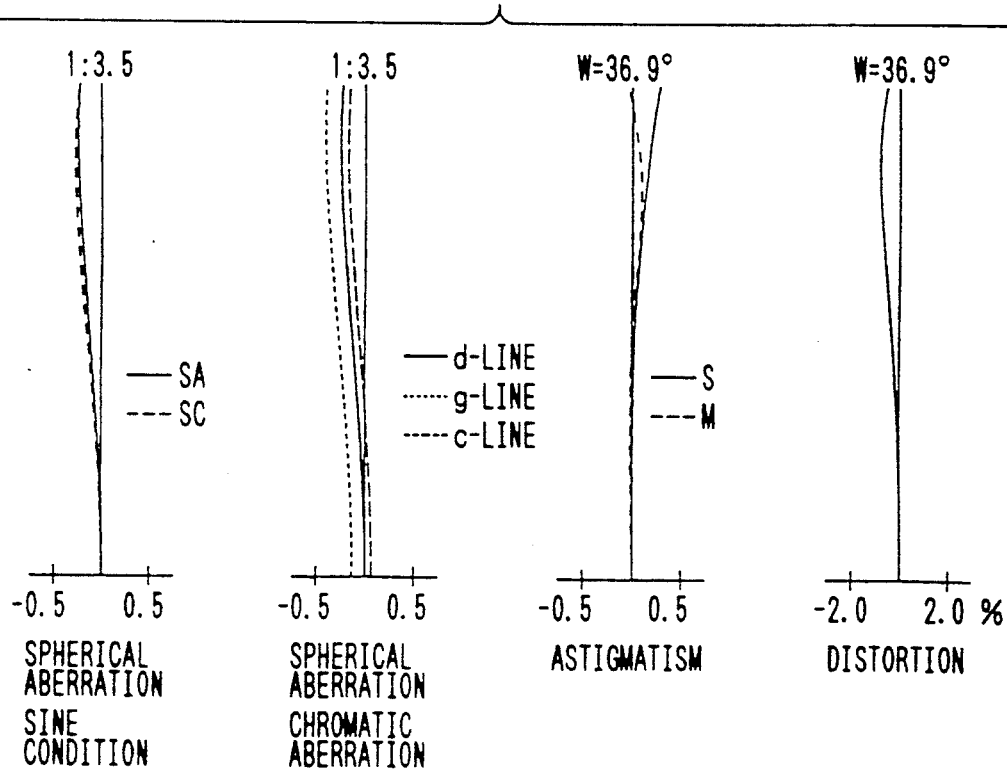
FIG. 10(a)–10(c) is a set of graphs plotting the aberration curves obtained with the zoom lens system of Example 5.
Figure 10B:
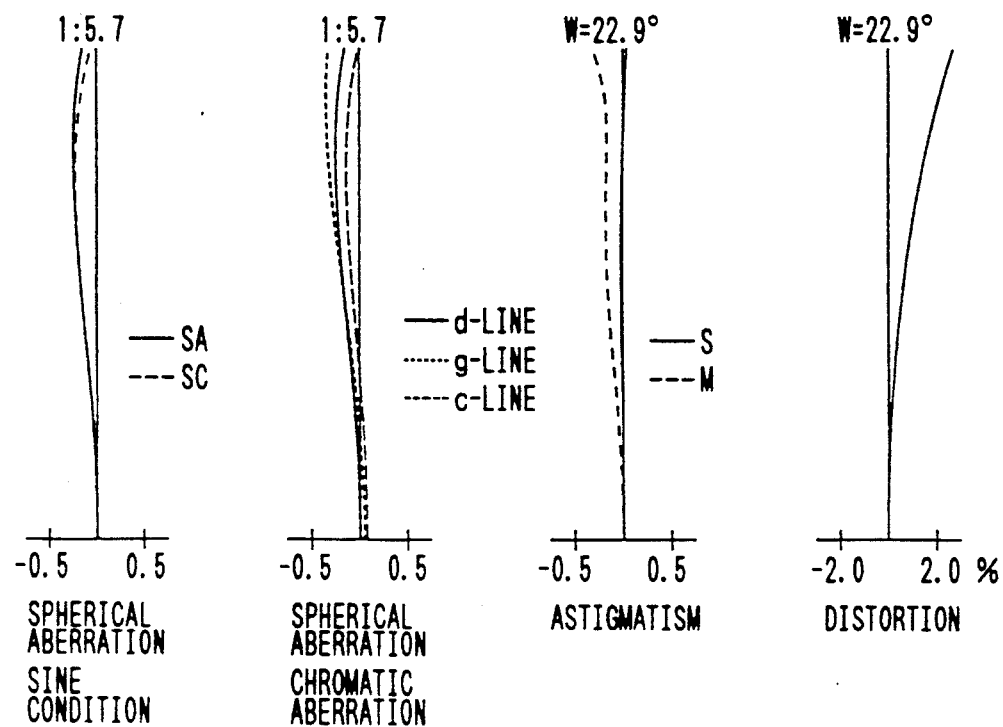
Figure 10C:
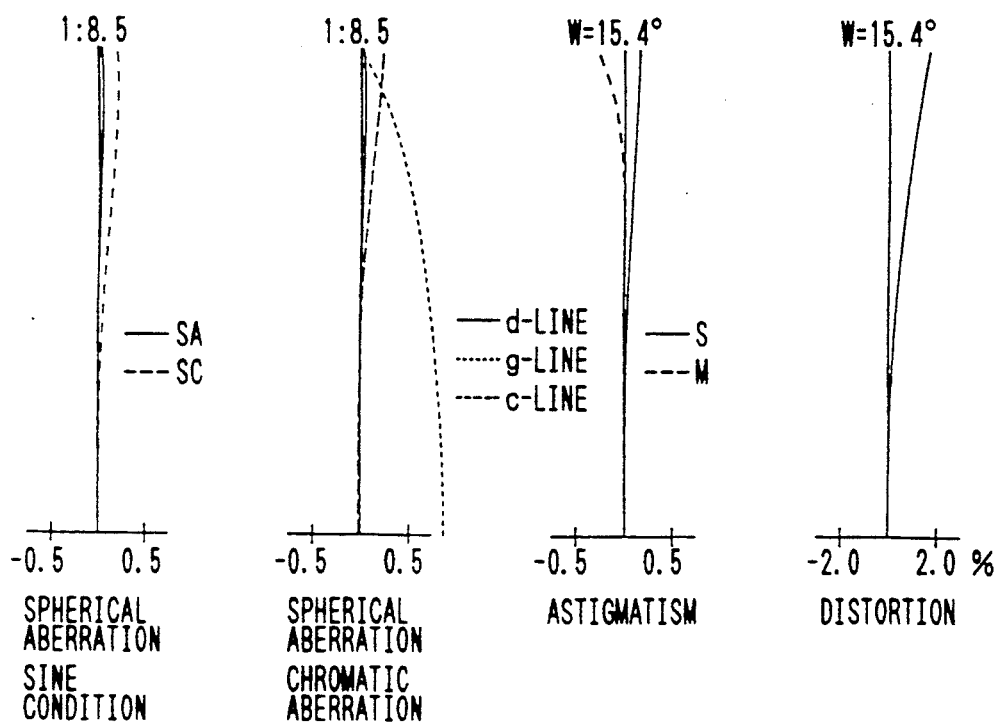

FIG. 9 is a simplified cross-sectional view of the zoom lens system according to Example 5 at the wide-angle end. Specific data for this example are as shown in Table 9. The aberration curves obtained with this lens system are plotted in FIGS. 10(a), 10(b) and 10(c).

TABLE 9

FNO. = 1:3.6, f = 29.00, ω = 36.9, fB = 8.30

| Surface No. | r | d | n | ν |
|---|---|---|---|---|
| 1 | −44.091 | 1.50 | 1.83400 | 37.2 |
| 2 | −158.262 | 2.11 | | |
| 3 | 172.771 | 4.12 | 1.69680 | 55.5 |
| 4 | −36.480 | variable | | |
| 5* | −20.537 | 5.26 | 1.78590 | 44.2 |
| 6 | −928.676 | 2.33 | | |
| 7 | 17.816 | 2.30 | 1.80518 | 25.4 |
| 8 | 13.815 | 7.00 | 1.58913 | 61.2 |
| 9* | −15.870 | variable | | |
| 10* | −52.722 | 2.95 | 1.68893 | 31.1 |
| 11 | −24.052 | 3.18 | | |
| 12 | −11.747 | 1.40 | 1.77250 | 49.6 |
| 13 | 329.855 | | | |

Fifth surface: aspheric
K = 0
α4 = −0.33845769 × 10$^{-4}$
α6 = −0.29857214 × 10$^{-6}$
α8 = 0.97450605 × 10$^{-9}$
Tenth surface: aspheric
K = 0
α4 = 0.44248919 × 10$^{-4}$
α6 = 0.37472218 × 10$^{-6}$
α8 = −0.97513187 × 10$^{-9}$
Ninth surface: aspheric
K = 0
α4 = 0.82760916 × 10$^{-4}$
α6 = 0.18424225 × 10$^{-6}$
α8 = 0.39884961 × 10$^{-9}$ The values of Fno., f, fB, ω, d4 and d9 vary with zooming as shown in Table 10 below.

TABLE 10

| FNo. | 3.5 | 5.9 | 8.5 |
|---|---|---|---|
| f | 29.00 | 50.01 | 72.32 |
| fB | 8.30 | 27.13 | 50.91 |
| ω | 36.9 | 22.9 | 15.4 |
| d4 | 3.30 | 7.14 | 10.00 |
| d9 | 11.13 | 5.34 | 2.35 |

Table 11 shows values that satisfy the conditions (a) to (e) in Examples 1 to 5.

| Condition | Ex. 1 | Ex. 2 | Ex. 3 | Ex. 4 | Ex. 5 |
|---|---|---|---|---|---|
| SF1 | −1.17 | −0.65 | −0.32 | −0.89 | −1.77 |
| N1 | 1.847 | 1.847 | 1.805 | 1.834 | 1.834 |
| N2 | 1.773 | 1.773 | 1.773 | 1.697 | 1.697 |
| SF2 | 0.25 | 0.17 | 0.13 | 0.41 | 0.65 |
| ΔI2b | −14.7 | −15.3 | −14.7 | −14.3 | −14.5 |

As described on the foregoing pages, the zoom lens system of the present invention adopts an arrangement as simple as a three-group composition and yet, by improving the first lens group, it features a winder view angle while reducing the lens diameter and the overall lens length. At the same time, it experiences less aberrational variations during zooming from the wide-angle to the narrow-angle end or from infinity to near distance and yet it insures a high zoom ratio of 2.5 and more. Consequently, the zoom lens system of the present invention can advantageously be used with a compact camera.

What is claimed is:

1. A zoom lens system comprising at least three lens groups which are arranged, in order from the object side, as a first lens group having a positive focal length, a second lens group having a positive focal length and a third lens group having a negative focal length, wherein, when zooming is carried out from a wide-angle to a telephoto end, said first, second and third lens groups are all moved towards the object so that the distance between said first and second lens groups increases whereas the distance between said second and third lens groups decreases, said first lens group having a first lens element on a side of said first lens group closest to the object, said first lens element having a concave lens surface on the side the closest to the object and satisfying the condition $$-3 < (r11 + r12)/(r11 - r12) < 0$$

where r11 is the radius of curvature of the surface on the object side of the first lens element in the first lens group, and r12 is the radius of curvature of the surface on the image plane side of the first lens element in the first lens group; and wherein said second lens group comprises, in order from the object side, a sub-group 2a having a negative focal length and a sub-group 2b having a positive focal length, said sub-group 2b having a divergent aspheric surface that satisfies the condition $$-30 < \Delta I2b < 0$$

where $\Delta I2b$ is the amount of variation in the coefficient of a spherical aberration due to the aspheric surface in the sub-group 2b (the aberration coefficient being such as is calculated with the focal length of the overall system at the wide-angle end being taken as 1.0).

2. A zoom lens system according to claim 1, wherein said first lens element is a negative lens element and wherein said first lens group comprises, in order from the object side, said negative first lens element and a positive second lens element and satisfies the conditions $$1.7 < N1$$

$$1.6 < N2$$

$$-0.5 < (r21 + R22)/(r21 - r22) < 1.5$$

where N1 is the refractive index at the d-line of the first lens element in the first lens group, N2 is the refractive index at the d-line of the second lens element in the first lens group, r21 is the radius of curvature of the surface on the object side of the second lens element in the first lens group; and r22 is the radius of curvature of the surface on the image plane side of the second lens element in the first lens group.

3. A zoom lens system comprising at least three lens groups which are arranged, in order from the object side, as a first lens group having a positive focal length, a second lens group having a positive focal length and a third lens group having a negative focal length, wherein, when zooming is carried out from a wide-angle to a telephoto end, said first, second and third lens groups are all moved towards the object so that the distance between said first and second lens groups increases whereas the distance between said second and third lens groups decreases, said first lens group having a first lens element on a side of said first lens group closest to the object, said first lens element having a concave lens surface on the side the closest to the object and satisfying the condition $$-3 < (r11 + r12)/(r11 - r12) \leq -0.32$$

where r11 is the radius of curvature of the surface on the object side of the first lens element in the first lens group, and r12 is the radius of curvature of the surface on the image plane side of the first lens element in the first lens group.

4. A zoom lens system according to claim 3, wherein said first lens element is a negative lens element and wherein said first lens group comprises, in order from the object side, said negative first lens element and a positive second lens element and satisifies the conditions $$1.7 < N1$$

$$1.6 < N2$$

$$0.13 \leq (r21 + r22)/(r21 - r22) < 1.5$$

where N1 is the refractive index at the d-line of the first lens element in the first lens group, N2 is the refractive index at the d-line of the second lens element in the first lens group, r21 is the radius of curvature of the surface on the object side of the second lens element in the first lens group; and r22 is the radius of curvature of the surface on the image plane side of the second lens element in the first lens group.

5. A zoom lens system according to claim 3, wherein said second lens group comprises, in order from the object side, a sub-group 2a having a negative focal length and a sub-group 2b having a positive focal length, said sub-group 2b having a divergent aspheric surface that satisfies the condition $$-30 < \Delta I2b < 0$$

where $\Delta I2b$ is the amount of variation in the coefficient of a spherical aberration due to the aspheric surface in the sub-group 2b (the aberration coefficient being such as is calculated with the focal length of the overall system at the wide-angle end being taken as 1.0).

* * * * *